United States Patent [19]

Kruk

[11] Patent Number: 4,785,165

[45] Date of Patent: Nov. 15, 1988

[54] METHOD AND APPARATUS FOR IDENTIFYING, CUTTING AND PROCESSING DOCUMENTS

[75] Inventor: Robert R. Kruk, Crestwood, Ill.

[73] Assignee: Inscerco Mfg. Inc., Crestwood, Ill.

[21] Appl. No.: 71,508

[22] Filed: Jul. 9, 1987

[51] Int. Cl.⁴ .................................................. G06F 15/20
[52] U.S. Cl. ................................................................ 235/375
[58] Field of Search ............................................. 235/375

[56] References Cited

U.S. PATENT DOCUMENTS 4,194,685 5/1980 Hill .................................... 235/375

*Primary Examiner*—Harold I. Pitts
*Attorney, Agent, or Firm*—Olson & Hierl

[57] ABSTRACT

The present invention provides a high-speed method and apparatus for processing a plurality of documents that have been preprinted and cut from single sheets of paper. Sheets including a plurality of preprinted documents are registered to straighten each sheet, read by a fiber optic scanner to identify each document for a microprocessor, cut into individual documents, collected as individual documents and held until needed as directed by the microprocessor and transferred from the collector to an inserting track for further processing including insertion into an envelope.

11 Claims, 2 Drawing Sheets

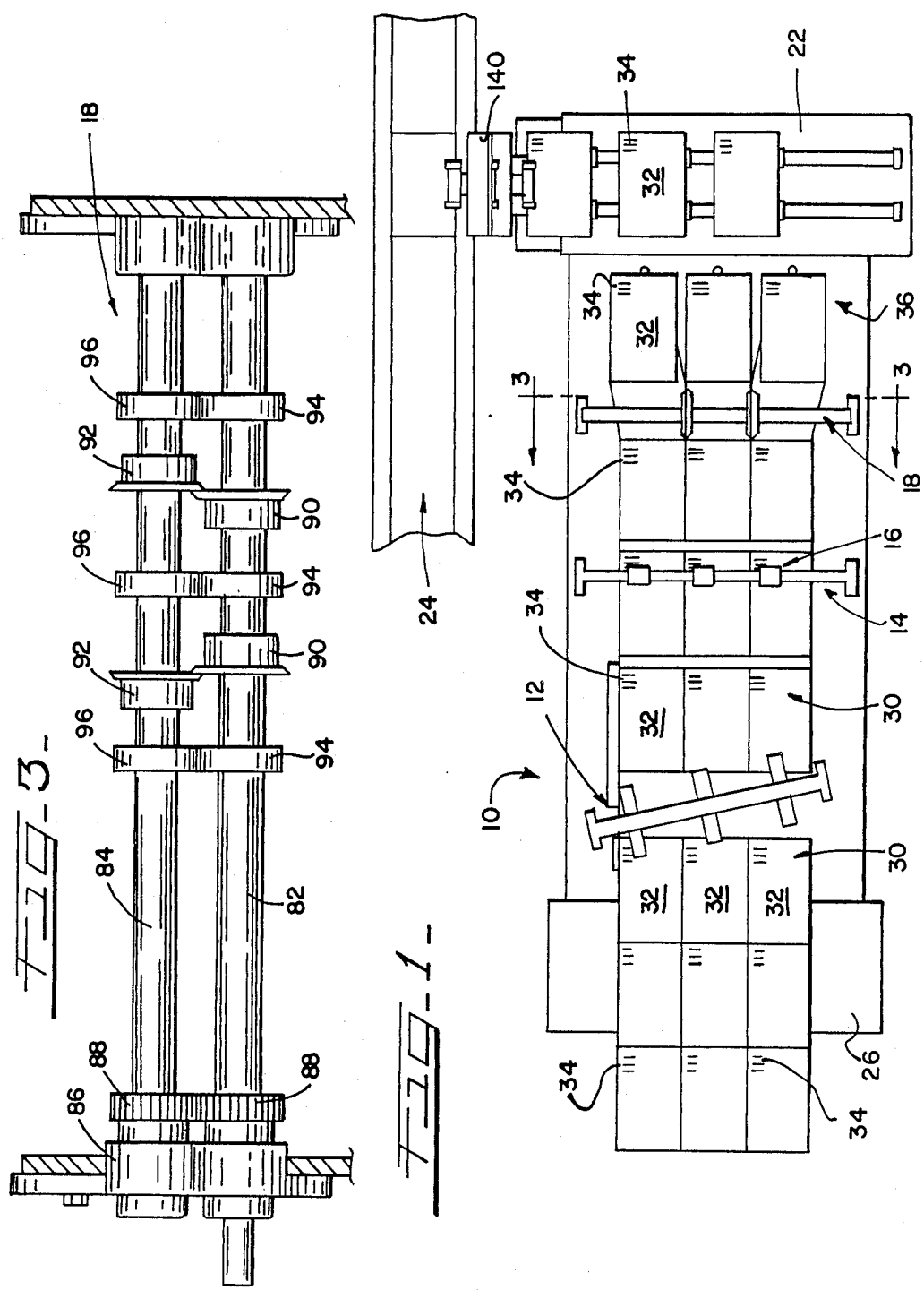

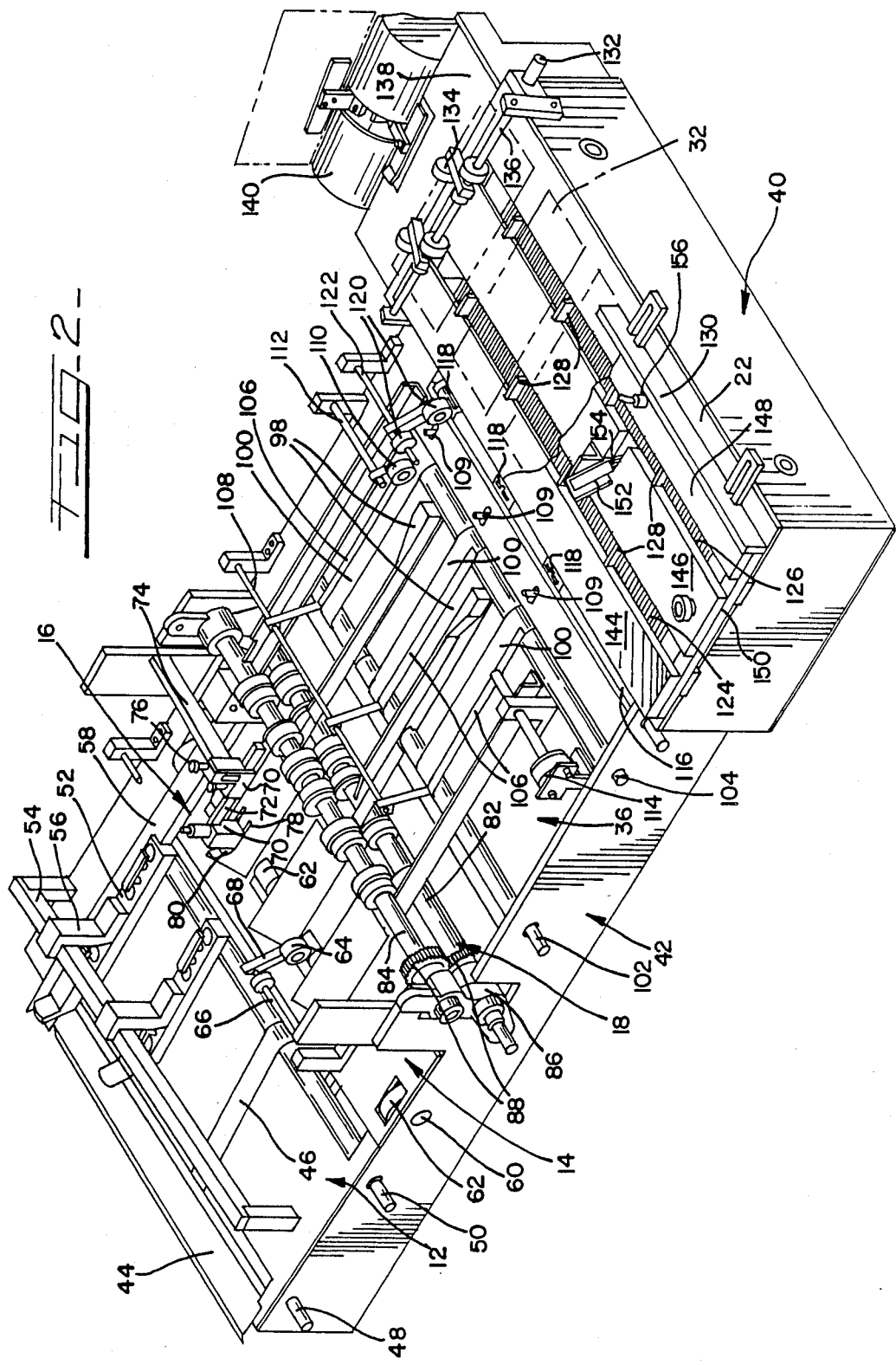

METHOD AND APPARATUS FOR IDENTIFYING, CUTTING AND PROCESSING DOCUMENTS

FIELD OF THE INVENTION

This invention relates to automated sheet handling systems and in particular to a system for identifying, cutting and processing a plurality of sheets, each sheet being preprinted with one or more documents having readable indicia means thereon.

BACKGROUND OF THE INVENTION

Automated mass mailing machines for high speed processing of large quantities of documents have been in use for many years. Such machines typically include a feeder that provides individual sheets or a cutter or burster that makes individual sheets from paper stock, a register board that straightens the individual sheets and feeds them to a folder which folds the sheets to envelope size, a sequencer that collates the sheets in the proper order, an inserting track that receives the folded sheets and adds other inserts to the folded sheets, and means for inserting the folded sheets along with inserts into envelopes.

These machines efficiently fold and process standard business size letters. Inserts such as bills or order forms, however, are usually small enough to be inserted into an envelope without folding. Existing machines are not equipped to rapidly and efficiently identify, cut and process these sized inserts.

Thus, for existing systems, a document can be printed on one sheet of paper and processed as a letter by folding the sheet to envelope size or a plurality of documents can be printed on one sheet of paper which is cut before processing. The first choice, folding, is not satisfactory because a considerable amount of paper is wasted, and the increase in the weight of the documents results in higher mailing costs. The second choice, cutting, is even less satisfactory since precutting is time consuming which defeats the whole advantage of such mass mailing machines.

Thus, a system is needed that allows preprinting of a plurality of documents on one sheet of paper and identifies, cuts and processes these documents at a high rate of speed.

SUMMARY OF THE INVENTION

The present invention relates to a method and apparatus for processing a plurality of documents preprinted on one sheet of paper at a high rate of speed. Individual sheets each including a plurality of preprinted documents from a document feeder, cutter or burster are registered to align each sheet. Each document is read "on the fly" by a scanner in communication with a microprocessor to identify the presence of each document and to identify a preprinted code on each document. The code read from each document is stored in the microprocessor. Each sheet is then cut into individual documents. The individual documents are held until needed as communicated by the microprocessor before being transferred from the collector to an inserting track for further processing including insertion into an envelope.

This process employs a register board which straightens and feeds the individual sheets past a scanner that reads a code or other indicia that has been preprinted on each document. The code on the document can comprise a plurality of spaced-apart lines or bars known as a bar code, a UPC code or the like. Cutting means separates the preprinted sheets into individual documents which are then collected and held in collector bins until the microprocessor directs the system to further process the documents. At that time, the documents are transferred to an inserting track by a conveyor. In a preferred embodiment, the conveyor is positioned transverse to the direction of travel of the documents and is used in combination with a clamp-type document turnover device for further processing of the documents including insertion into an envelope.

Thus, the present invention uses individual sheets comprising a plurality of preprinted coded documents thereby saving paper and reducing the weight and mailing cost of the envelope. The present invention also efficiently processes these preprinted documents at a high rate of speed.

BRIEF DESCRIPTION OF THE DRAWINGS

FIG. 1 is a schematic diagram showing one embodiment of the present apparatus;

FIG. 2 is a perspective view of the embodiment shown in FIG. 1; and

FIG. 3 is a cut-away view of the cutting means taken along the Plane 3—3 of FIG. 2.

DETAILED DESCRIPTION OF A PREFERRED EMBODIMENT

Referring to FIG. 1, the apparatus of the present invention is represented generally by the reference number 10. Individual sheets of paper 30 comprising a plurality of preprinted coded documents 32 per sheet are supplied by a sheeting feeding means 26 which can comprise a burster that breaks apart perforated sheets supplied from, for example, a computer printer. In the alternative, the individual sheets 30 can be supplied from a cutter if no perforations are present or from a conventional document feeder if the sheets 30 are already separated.

After receiving the individual sheets 30 from the sheet feeding means 26, a register means 12 straightens the individual sheets 30 and properly aligns them for the next stage of the process in which scanner means 16 in a read area 14 reads a code or other indicia means 34 included on each preprinted document 32. The code can comprise a bar code, UPC code or the like. The code read from each document is stored in a microprocessor. The general use of a microprocessor to control the processing of documents in a mass mailing machine is known in the art. The microprocessor can be a conventional micro computer which is programmed to produce the results described herein or a specially constructed device that produces the desired result. The microprocessor stores the identity of each of the preprinted coded documents 32 to provide for insertion of each document with other selected inserts such as a cover letter further along the inserting track 24 of the machine.

After scanning, the individual sheets 30 are fed from the read area 14 into cutting means 18 which separates the preprinted sheets 30 into individual documents 32 corresponding to the number of documents 32 preprinted on each sheet 30. As shown in the Figures, if three coded documents are preprinted on each sheet, then a triple line of documents is produced. This is known in the industry as a "three-up" configuration. "Two-up" and other configurations are also possible.

The separated documents 32 are then fed into collector bins 20 where they are stored until they are to be transferred to the inserting track 24 of the mass mailing machine, as directed by the microprocessor.

Because standard mass mailing machines insert documents into an envelope perpendicularly to the movement of the documents on the inserting track, the documents must be added to the inserting track lengthwise. With insert processors that are currently available, this is not a problem because the individual sheets of paper have only one document printed thereon and can be processed perpendicularly to the inserting track, with the documents being fed onto the inserting track after they have been folded. Because a plurality of preprinted documents in the present invention are on a single page, such perpendicular processing leaves the documents positioned incorrectly for insertion on the inserting track.

Thus, prior to insertion onto the inserting track 24, the cut documents 32 must be realigned to a lengthwise position. In the present invention, this is accomplished by processing the documents 32 parallel to the inserting track 24 and then realigning the documents 32 with a transverse conveyor 22 prior to feeding onto the inserting track 24.

Referring to FIG. 2, the present apparatus is again shown generally as 10. Two box frames, a transverse frame 40 housing the transverse conveyor 22 and a main frame 42 housing the remaining components of the apparatus, are provided. Individual sheets of paper 30 each comprising a plurality of preprinted coded documents 32 are provided from the sheet feeding means to the posterior end of the main frame 42. A guide plate 44 overlaps the posterior edge of the main frame 42 to receive the individual sheets 30 from the sheet feeding means. The individual sheets 30 are thus passed over the guide plate 44 and into the register means which is shown generally as 12.

The register means 12 includes a plurality of conveyor belts 46 continuously driven between an anterior shaft 48 and a posterior shaft 50 that are journaled in the main frame 42. The driving mechanism for the conveyor is conventional and includes an electronic motor and a belt/pulley assembly (not shown). Each conveyor belt 46 is positioned under a corresponding ski guide 52 which is attached to a raised bar support 54 by a bracket 56. In FIG. 2, one ski guide 52 has been removed to illustrate the conveyor belt 46, while the other conveyor belts are not visible but are positioned beneath the ski guides 52.

As can be seen move clearly in FIG. 1, the raised bar support 54, conveyor belts 46 and ski guides 52 are positioned at a slight angle relative to the longitudinal axis of the main frame 42. Thus, as the individual sheets 30 are received in the register means 12, they are urged by the plurality of conveyor belts 46 towards a register bar guide 58 positioned along one side of the main frame 42. This straightens the individual sheets 30 and aligns them for further processing.

After registering, the individual sheets 30 are fed by the conveyor belts 46 into the read area which is shown generally as 14. A shaft 60 having a plurality of guide rollers 62 is journaled in the main frame 42 at the posterior edge of the rear area 14. A conventional belt/pulley drive means (not shown) can be used to rotate the shaft. Tension rollers 64 corresponding to the plurality of guide rollers 62 are supported by an overhead bar 66 and are biased against their respective guide rollers 62 by spring biasing elements 68.

Thus, the individual sheets 30 are fed from the register means 12 to the rear area 14 by the conveyor belts 46 and are propelled through the rear area 14 by the guide rollers 62. A register bar guide 58 is positioned along one side of the read area 14 to ensure proper alignment of the individual sheets 30.

The read area 14 includes scanner means 16 which reads the code or indicia means 34 preprinted on the documents 32. The scanner means 16 is in operative communication with the microprocessor and identifies the presence of each document and the preprinted code on each document. The code read from each document is also stored in the microprocessor.

In the described preferred embodiment, the scanner means 16 includes a plurality of fiber optic scanners positioned to correspond with the code 34 or other indicia means preprinted on each document. In FIG. 2, only one such scanner is shown. However, in this embodiment, a set of three scanners is used to read the code on each document of the "three-up" sheet. This is more clearly shown in FIG. 1. Each scanner of the scanner means 16 is attached to a longitudinal placement track 72 which is supported by a bracket 70. This bracket 70 is supported on a latitudinal overhead placement track 74. By use of adjustment screws 76 provided in the bracket 70, both longitudinal and latitudinal adjustments can be made to properly align a scanner over a preprinted bar code 34.

The bottom of the scanner means 16 includes a guide ski 78 under which the preprinted sheet 30 passes. A pluarlity of read plates 80 corresponding to the number of fiber optic scanners is provided to support and provide optimum reading background as the preprinted sheets 30 pass through the scanning means.

Anterior to the read area is the cutting means which is shown generally as 18. A cross-section taken along the plane 3—3 of FIG. 2 to better show the detail of the cutting means 18 is provided in FIG. 3. Referring to FIG. 3, a pair of shafts 82 and 84 are positioned parallel to each other with the ends of each shaft 82 and 84 journaled in sprockets 86 attached to the main frame 42. The left end of one of the shafts 82 extends beyond the main frame 42 and is attached to a drive means (not shown) in a conventional manner.

A pair of meshing gears 88 of equal diameter is mounted on each shaft so that, as the shaft 82 attached to the drive means is rotated, the second shaft 84 rotates at the same speed but in the opposite direction. A plurality of blade wheels 90 and 92 are movably mounted on each shaft 82 and 84 with each blade wheel 90 on a shaft 82 having a corresponding blade wheel 92 on the second shaft 84 aligned so that the blades meet and overlap. As the individual sheets 30 pass between the rotating shafts 82 and 84, the blade wheels 90 and 92 act as scissor blades to cut the sheets 30 into individual documents 32.

A plurality of guide rollers 94 and 96 are also mounted in pairs, one on each shaft, at positions between the blade wheels 90 and 92. The guide rollers 94 and 96 rotate as do the blade wheels 90 and 92 thus guiding the individual sheets 30 through the cuting means 18.

Referring again to FIG. 2, after the documents 32 have been separated by the cutting means 18, they proceed to the collector means which is shown generally as 36. Just anterior to the cutting means 18 is a plurality of guide bars 98 which form a plurality of collection bins 20 corresponding to the number of documents 32 preprinted on the individual sheets 30. Each collection bin 20 has a continuously moving conveyor belt 100 which is driven between an anterior shaft 102 and posterior shaft 104 journaled in the main frame 42.

A deflector strip 106 supported by an overhead bar 108 runs along the length of each of the conveyor belts 100. Vertically displaceable stop fingers 109 are provided at the anterior end of the collection bins 20 and are controlled by drive means in communication with the microprocessor.

A plurality of normally unbiased tension rollers 110, one corresponding to each conveyor belt 100, is also provided. These tension rollers 110 are supported by a rotatable overhead bar 112 which is rotated by drive means 114 in communication with the microprocessor. When the cutapart documents 32 are needed, the microprocessor directs the displacement of the stop fingers 109 downwardly while biasing the tension rollers 110 against the documents 32, thus causing the conveyor belts 100 to move the documents 32 forward.

Anterior to the stop fingers 109 is a continuously driven shaft 116 having a plurality of friction elements 118 corresponding to each collection bin 20. A plurality of tension rollers 120 biased against each friction element 118 is supported by an overhead bar 122. After passing from the collection bins 20, the documents come into contact with the drive shaft friction elements 118 which propel the documents forward.

Anterior to the drive shaft 116, the transverse conveyor is shown generally as 22. The transverse conveyor 22 is mounted in the transverse frame 40 and includes two parallel conveyor belts 124 and 126 which run perpendicular to the movement of the documents on the main frame 42. Each conveyor belt 124 and 126 includes a plurality of vertically raised stop flaps 128 aligned to form an insert rest between the two conveyor belts 124 and 126. A stop bar 130 runs across the anterior of the transverse frame 40 and is aligned parallel to the conveyor belts 124 and 126.

At the right end of the transverse frame is a continuously-driven guide shaft 132 journaled in the transverse frame 40. Biased guide rollers 134 supported by an overhead bar 136 are positioned against the guide shaft 132. Posterior to the guide shaft 132 is a rest plate 138 substantially the same size as the documents 32. A collector turnover device 140 is positioned posterior to the rest plate 138 with the collecting arms 142 aligned with an indent in the rest plate 138.

The transverse conveyor 22 is provided with a cover consisting of three plates 144, 146 and 148 supported at each end by a support bar 150 which is mounted on the transverse frame 40. Spacing between the three plates 144, 146 and 148 is aligned so the stop flaps 128 of the conveyor belts 124 and 126 can extend above the lower surface of the three plates 144, 146 and 148. Mounted on the middle plate 146 and corresponding to each document path is a plurality of brackets 152 having a hold-down brush 154 extending downwardly through apertures to below the lower surface of the plates. Provided on the anterior plate 148 and corresponding to each document path is a plurality of fiber optic scanners 156 in communication with the microprocessor to detect the presence of a document 32.

When the stop fingers 109 are withdrawn and the normally unbiased guide rollers 110 are biased, the individual documents 32 are driven in an anterior direction into the friction elements 118. The friction elements 118 shoot each document 32 into the insert rest provided between corresponding stop flaps 128 on the two traverse conveyor belts 124 and 126. Because the documents 32 are directed into the traverse conveyor 22 at a high rate of speed, hold-down brushes 154 are provided which prevent the documents 32 from rebounding off the stop bar 130. The transverse conveyor stop flaps 128 then move the document 32 towards the collector turnover device 140. One by one, the documents 32 are deposited onto the rest plate 138 from where a collecting arm 142 of the collector turnover device grabs each document 32, turns the document over and releases it on the inserting track 24. When the fiber optic scanners 156 indicate that no documents 32 are on the transverse conveyor 22, the microprocessor directs a repetition of the process.

While in the described embodiment, all of the preprinted documents 32 are the same, different documents can also be preprinted on the single sheet of paper. If all are to be added to each envelope, the collector turnover device 140 can simply wait until all documents are collected on the rest plate 138 before grabbing and depositing the documents onto the inserting track 24.

If each envelope is to have only one or a combination of the separate documents, the collection means 36 can be altered to enable the storage of multiple cut documents and the release of one of the collected documents at a time. Processing of these differing combinations of documents is controlled by the operator of the system and the microprocessor.

It should be understood that various modifications, changes and variations in addition to those herein discussed may be made in the arrangement, operation and details of construction of the elements disclosed herein without departing from the spirit and scope of the invention.

What is claimed is:

1. An apparatus including an inserting track for identifying, cutting and processing a plurality of coded documents comprising:

means for feeding paper sheets having a plurality of coded documents printed thereon;

register means for aligning the paper sheets;

first scanning means for determining the presence of a document and for reading the code from each document;

processor means to store code read from each document;

cutting means for separating the sheets into individual documents corresponding to the number of documents preprinted on the sheets;

collector means for receiving; storing and releasing the separated documents; and means for transferring the separated documents onto the inserting track for further processing.

2. The apparatus of claim 1, wherein the register means includes guide means and a plurality of conveyor belts positioned to direct the sheets towards the guide means.

3. The apparatus of claim 1 wherein the cutting means includes two parallel shafts driven in opposite directions, each shaft including a plurality of wheel blades mounted thereon aligned to provide a scissor-type cutting action with the corresponding wheel blades mounted on the other shaft.

4. The apparatus of claim 1 wherein the collector means includes a plurality of collection bins including stop means for retaining the separated documents.

5. The apparatus of claim 1 wherein the transferring means includes a transverse conveyor which receives the separated documents and realigns the documents for placement on the inserting track.

6. The apparatus of claim 5 wherein the transferring means further includes a collector turnover means for placing the separated documents on the inserting track.

7. The apparatus of claim 1 wherein the collector means further includes means for releasing individual documents from a group of collected documents.

8. The apparatus of claim 1 wherein the microprocessor is in communication with the first scanner means to read and store the information contained in the preprinted code, the microprocessor is in communication with the documents to determine when the documents are needed on the inserting track and the microprocessor is in communication with the collector means to control the serial release of the documents to the inserting track.

9. A method for identifying, cutting and processing a plurality of coded documents comprising the steps of:
   feeding paper sheets having a plurality of coded documents printed thereon;
   registering the sheets to align each sheet;
   cutting each sheet into individual documents corresponding to the number of documents printed on each sheet;
   collecting the individual documents; and
   transferring the collected documents onto an inserting track.

10. The process of claim 9 further including the step of aligning the individual documents before transferring the documents to the track.

11. The process of claim 9 further including after the step of registering and before the step of cutting, the step of reading a preprinted code on each document to determine how the document should be processed.

* * * * *

UNITED STATES PATENT AND TRADEMARK OFFICE
CERTIFICATE OF CORRECTION

PATENT NO.  : 4,785,165

DATED       : November 15, 1987

INVENTOR(S) : Robert R. Kruk

It is certified that error appears in the above-identified patent and that said Letters Patent is hereby corrected as shown below:

On the Title Page, the list of cited references should also include the following U.S. patent documents:

| | | | |
|---|---|---|---|
| 4,381,107 | 4/83 | Armiger. . . . . | .270/58 |
| 4,312,169 | 1/82 | Golicz et al.. . | .53/206 |
| 4,273,319 | 6/81 | Stocker. . . . . | .270/21.1 |

Colmn 6, line 59, "claim 1," should be --claim 1--.

Signed and Sealed this

Eleventh Day of April, 1989

Attest:

DONALD J. QUIGG

Attesting Officer

Commissioner of Patents and Trademarks